No. 780,781. PATENTED JAN. 24, 1905.
H. H. CURTIS.
SPOON.
APPLICATION FILED DEC. 16, 1904.

WITNESSES
A.G. Pieczentkowski.
William E. Brown

INVENTOR.
BY Henry H. Curtis
Horatio E. Bellows
ATTORNEY

No. 780,781. Patented January 24, 1905.

UNITED STATES PATENT OFFICE.

HENRY H. CURTIS, OF NORTH ATTLEBORO, MASSACHUSETTS.

SPOON.

SPECIFICATION forming part of Letters Patent No. 780,781, dated January 24, 1905.

Application filed December 16, 1904. Serial No. 237,086.

*To all whom it may concern:*

Be it known that I, HENRY H. CURTIS, a citizen of the United States, residing at North Attleboro, in the county of Bristol and State of Massachusetts, have invented certain new and useful Improvements in Spoons, of which the following is a specification, reference being had therein to the accompanying drawings.

My invention relates to baby-spoons, and has for its primary objects increased strength, cheapness, and utility. Originally solder was employed upon spoons of this type to join the extremities of the looped handle to the bowl. The heat required in the soldering process annealed and weakened the structure at its point of greatest strain and defaced the appearance of the product. To avoid the use of solder, such spoons were later constructed with one extremity of the looped handle detached. The free end, however, invited accidental interference with the clothing or body of the infant.

To the above ends my invention consists in the novel structure hereinafter described, and illustrated in the accompanying drawings, wherein—

Figure 1:
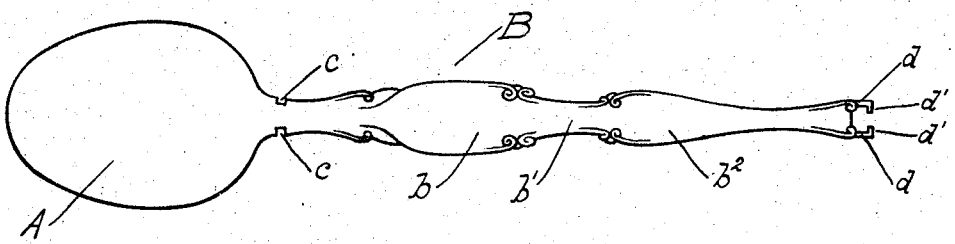
Figure 2:
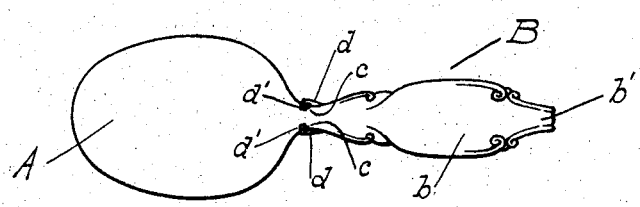
Figure 3:
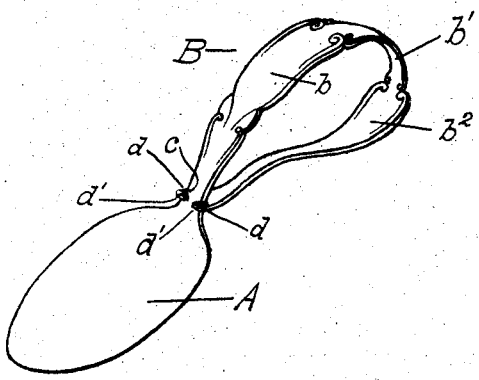

Figure 1 is a plan elevation of a spoon-blank embodying my invention; Fig. 2, a like view of the same bent into final form and swaged, and Fig. 3 a perspective view of the same.

Like reference-letters indicate like parts throughout the views.

My new spoon and its construction is as follows: From a strip of silver or other suitable metal is stamped and cut by suitable dies a flat blank comprising the bowl A and handle B. The latter has laterally-swelled portions $b$ and $b^2$, intermediate which is a restricted portion $b'$. The handle has lateral notches $c$ adjacent the bowl, and its extremity is bifurcated, having two prongs or projections $d$ with inwardly-directed extremities $d'$.

To complete the spoon, the bowl portion A is cupped in the usual manner and the handle B is looped with the swelled portion $b$ in the upper limb of the handle and the portion $b^2$ in the lower limb thereof. The restricted portion $b'$ forms the end of the loop. The prongs $d$ register in the notches $c$, where the prong extremities are swaged or otherwise inwardly bent over the portion of the handle intermediate the notches.

The restricted or narrowed portion of the handle $b'$ facilitates the handling of the spoon.

Having described my invention, what I claim is—

1. A spoon of the type set forth formed from a single blank comprising a bowl, a handle in loop form upon the bowl, and means upon the handle extremity for engaging the portion of the handle adjacent the bowl.

2. A spoon of the type set forth comprising a bowl, a looped handle integral with the bowl, and prongs upon the handle extremity engaging the portion of the handle adjacent the bowl.

3. A spoon of the type set forth comprising a bowl, a looped handle integral with the bowl and provided adjacent the bowl with notches, and prongs upon the handle extremity registering in the notches.

4. A spoon of the type set forth comprising a bowl, a looped handle integral with the bowl comprising broad upper and lower limbs and a retracted portion intermediate said limbs, and means upon the handle extremity for engaging the portion of the handle adjacent the bowl.

In testimony whereof I have affixed my signature in presence of two witnesses.

HENRY H. CURTIS.

Witnesses:
 HORATIO E. BELLOWS,
 WILLIAM E. BROWN.